US012567819B2

(12) United States Patent
Dietrich et al.

(10) Patent No.: US 12,567,819 B2
(45) Date of Patent: Mar. 3, 2026

(54) METHOD FOR OPERATING A PERMANENTLY EXCITED SYNCHRONOUS MOTOR OF A HAND-HELD WORKING DEVICE, AND HAND-HELD WORKING DEVICE

(71) Applicant: Andreas Stihl AG & Co. KG, Waiblingen (DE)

(72) Inventors: Simon Dietrich, Waiblingen (DE); Jan Lukas Jackenkroll, Waiblingen (DE); Christian Eberle, Korb (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 142 days.

(21) Appl. No.: 18/502,436

(22) Filed: Nov. 6, 2023

(65) Prior Publication Data

US 2024/0154551 A1 May 9, 2024

(30) Foreign Application Priority Data

Nov. 7, 2022 (EP) ..................................... 22205895

(51) Int. Cl.
| | |
|---|---|
| *H02P 6/20* | (2016.01) |
| *A01D 46/26* | (2006.01) |
| *H02K 7/14* | (2006.01) |
| *H02P 6/08* | (2016.01) |
| *H02P 6/185* | (2016.01) |
| *H02P 6/22* | (2006.01) |

(52) U.S. Cl.
CPC ............. *H02P 6/185* (2013.01); *H02K 7/145* (2013.01); *H02P 6/08* (2013.01)

(58) Field of Classification Search
CPC ...... A01D 46/264; A01D 34/90; A01D 34/37; A01D 34/02; A01D 46/26; A01D 34/78; A01D 2046/266; H02P 6/22; H02P 6/185; H02P 6/08; H02P 6/20; H02K 7/145
USPC ..................................................... 318/400.32
See application file for complete search history.

(56) References Cited

U.S. PATENT DOCUMENTS

| | | |
|---|---|---|
| 5,191,270 A | 3/1993 | McCormack |
| 5,327,053 A | 7/1994 | Mann et al. |
| 5,432,414 A | 7/1995 | Sakurai et al. |
| 2009/0195198 A1 | 8/2009 | Lee |

(Continued)

FOREIGN PATENT DOCUMENTS

DE        102014226285 A1 *  6/2015  ............... H02P 1/02

OTHER PUBLICATIONS

DE102014226285A1_ENGLISH_MACHINE_TRANSLATION (Year: 2014).*

*Primary Examiner* — Gabriel Agared
(74) *Attorney, Agent, or Firm* — Crowell & Moring LLP

(57) ABSTRACT

A method for operating a permanently excited synchronous motor of a hand-held working device includes the steps of: sensorlessly determining a position variable representative of a position of a rotor of the synchronous motor at a standstill; determining a direction variable for a continuous rotation of the rotor from standstill in a direction on the basis of the determined position variable such that an absolute value of an attainable torque that can be generated by the synchronous motor during its sensorless actuation for the rotation in the direction is greater than an absolute value of a breakaway torque limit of the working device; and sensorlessly actuating the synchronous motor on the basis of the determined direction variable for the rotation in the direction.

16 Claims, 3 Drawing Sheets

(56)         References Cited

U.S. PATENT DOCUMENTS

| | | | | |
|---|---|---|---|---|
| 2014/0035495 A1* | 2/2014 | Kim | ........................ | H02P 27/12 |
| | | | | 318/400.17 |
| 2015/0180391 A1 | 6/2015 | Ogawa | | |
| 2018/0226906 A1* | 8/2018 | Chen | ........................ | H02P 6/183 |
| 2018/0351487 A1* | 12/2018 | Bourse | ...................... | H02P 6/08 |
| 2020/0195178 A1* | 6/2020 | Wu | .......................... | H02P 1/46 |
| 2020/0343838 A1* | 10/2020 | Thrush | ................. | B25D 11/064 |

* cited by examiner 1,1',1"

2,4

3

6,6'

5,5'

1,1'"

5

METHOD FOR OPERATING A PERMANENTLY EXCITED SYNCHRONOUS MOTOR OF A HAND-HELD WORKING DEVICE, AND HAND-HELD WORKING DEVICE

CROSS REFERENCE TO RELATED APPLICATION

This application claims priority under 35 U.S.C. § 119 from European Patent Application No. 22205895.0, filed Nov. 7, 2022, the entire disclosure of which is herein expressly incorporated by reference.

BACKGROUND AND SUMMARY

The invention relates to a method for operating a permanently excited synchronous motor of a hand-held working device and to a hand-held working device.

The invention is based on the problem of providing a method for operating a permanently excited synchronous motor of a hand-held working device and a hand-held working device, each of which has improved properties.

The invention solves this problem by providing a method and a hand-held working device described in the independent claims. Advantageous developments and/or embodiments of the invention are described in the dependent claims.

The method according to the invention is for operating a permanently excited synchronous motor of a hand-held working device. The method comprises the steps of: a) sensorlessly determining a position variable representative of a position of a rotor of the synchronous motor at a standstill, in particular of the rotor; b) determining a direction variable for a continuous rotation of the rotor from standstill in a direction on the basis of the determined position variable such that an absolute value of an attainable torque that can be generated by the synchronous motor during its, in particular sensorless, actuation for the rotation in the direction is greater than an absolute value of a breakaway torque limit of the working device; c) in particular sensorlessly actuating the synchronous motor on the basis of the determined direction variable for the rotation in the direction.

This enables, in particular, the sensorless determination and the sensorless actuation, a simple and/or, in particular thus, cost-effective construction of the synchronous motor and/or, in particular thus, of the working device.

Additionally or alternatively, this enables, in particular, the determination of the direction variable, and in particular reliable starting or turning or turning-on of the synchronous motor, especially from any possible position of the rotor.

In particular, the method, operation, determination and/or actuation can be automatic.

The term "start" or "turn or turn-on" can be used synonymously for the term "operate".

The term "brushless DC motor" (BLDC or BL motor for short and also electronically commutated motor, EC motor for short) or "permanent magnet synchronous motor" can be used synonymously for the term "permanently excited synchronous motor". Additionally or alternatively, the synchronous motor may be three-phase and/or may have a stator, in particular a three-phase stator. Further additionally or alternatively, the synchronous motor cannot or does not need to have a magnetic sensor, such as a Hall sensor, in particular for determination and actuation. Reference is also made to the specialist literature.

The working device may have a tool, wherein the synchronous motor may be designed to drive the tool. Additionally or alternatively, the working device may be electrical, in particular a battery-powered device. Further additionally or alternatively, the working device can be a gardening, forestry, construction or soil working device.

Hand-held working device can mean that the working device can have a mass of at most 50 kg (kilograms), in particular at most 20 kg, in particular at most 10 kg, in particular at most 5 kg, and/or at least 0.2 kg, in particular at least 0.5 kg, in particular at least 1 kg, in particular at least 2 kg.

The working device may have a user-operable operating element, wherein step c), in particular the method, can be initiated or executed depending on operation of the operating element.

The term "includes" or "has" can be used synonymously for the term "comprises".

The term "transducer" can be used synonymously for the term "sensor".

The term "identify" can be used synonymously for the term "determine".

The position variable can be initial or incipient and/or present and/or physical.

The position variable, position, direction variable and/or direction can/may have a value.

The position can be absolute and/or a rotational position.

The term "angular position" or "location" can be used synonymously for the term "position".

At a standstill can mean at a rotational speed of zero.

The term "characteristic" can be used synonymously for the term "representative".

The term "choose" can be used synonymously for the term "determine".

The direction variable can be physical.

The direction variable and/or direction can be, especially at a time, and/or either a clockwise direction or a counterclockwise direction.

Continuous rotation can mean temporally permanent and/or uninterrupted and/or without a standstill and/or by at least 180° (degrees), in particular at least 360°, and/or for reaching a target rotational speed, in particular at least 10% (percent) of a nominal speed, of the rotor.

The term "turn" can be used synonymously for the term "rotate".

The direction can be a direction of rotation.

The term "based on" can be used synonymously for the term "on the basis of".

Attainable can be theoretically attainable.

The term "starting torque" or "start-up torque" can be used synonymously for the term "torque".

The term "achievable" can be used synonymously for the term "producible".

The term "tear" can be used synonymously for the term "break".

The term "threshold" can be used synonymously for the term "limit".

The breakaway torque limit can be set or predefined on the basis of an in particular minimum required breakaway torque, in particular in an intended or correct and/or free or load-free, in particular unblocked or non-jammed, state of the working device, and/or set or predefined, in particular by the factory or manufacturer and/or firmly, in particular so as to be equal to or greater than the breakaway torque, and/or cannot be predefined by a user.

The attainable torque may depend on the position that can be fixed or cannot be determined and the direction that can be determined, in particular is determined. Additionally or alternatively, the absolute value of the torque for the rotation in, in particular at least, one of two possible directions can always be reached, since the working device, in particular the synchronous motor, can be designed or formed in this way.

Depending on the position, the rotation can be defined either in a first direction, and especially not in a second direction, or in the second direction, and especially not in the first direction, or in the first direction or in the second direction, where the second direction may be opposite the first direction.

In step b), it is possible, but not necessary, to determine the absolute value of the torque and/or whether the absolute value of the torque for the rotation in the direction is greater than the absolute value of the breakaway torque limit.

In step c), the synchronous motor can be actuated in the manner underlying step b).

Step b) may be performed after step a) in terms of time. Additionally or alternatively, step c) may be performed after step b) in terms of time.

The actuation can be by generating actuation voltages for the, in particular three, phases of the synchronous motor and/or can comprise commutation, in particular be commutation.

The term "configured" or "set up" can be used synonymously for the term "designed".

In one development of the invention, step b) involves: determining the direction variable for the rotation in the first direction, and especially not in the second direction, if the determined position variable is in, in particular at least, a first position variable range representative of a first position range of possible positions of the rotor. In the first position range, the absolute value of the torque for the rotation in the first direction is greater than, and in the second direction is equal to or less than, the absolute value of the breakaway torque limit. The second direction is opposite the first direction. This allows the determination to be simple and/or, in particular thus, fast. In particular, the term "sector" or "interval", in particular "limited interval", can be used synonymously for the term "range". Additionally or alternatively, it can be determined in step b) whether or not the position variable is in the first position variable range.

In one embodiment of the invention, step b) involves: determining the direction variable for the rotation in the second direction, and especially not in the first direction, if the determined position variable is in, in particular at least, a second position variable range representative of a second position range of possible positions of the rotor. The second position variable range differs, especially completely, from the first position variable range. In the second position range, the absolute value of the torque for the rotation in the second direction is greater than, and in the first direction is equal to or less than, the absolute value of the breakaway torque limit.

Additionally or alternatively, step b) involves: determining the direction variable for the rotation, in particular either, in the first direction or in the second direction if the determined position variable is in, in particular at least, a third position variable range representative of a third position range of possible positions of the rotor. The third position variable range differs, in particular completely, from the first position variable range and in particular the second position variable range. In the third position range, the absolute value of the torque for the rotation in the first direction and in the second direction is greater than the absolute value of the breakaway torque limit.

This allows easy and/or quick determination for any possible position.

In particular, in step b) it can be determined whether or not the position variable is in the second position variable range, and/or in the third position variable range.

In one embodiment of the invention, the first position range and/or the second position range and/or the third position range extend(s), in particular in each case, over a minimum of 1°, in particular a minimum of 2°, in particular a minimum of 5°, and/or a maximum of 180°, in particular a maximum of 120°, in particular a maximum of 60°. Additionally or alternatively, the first position range is one of a plurality of first position ranges and/or the second position range is one of a plurality of second position ranges and/or the third position range is one of a plurality of third position ranges. Further additionally or alternatively, the first position variable range is one of a plurality of first position variable ranges and/or the second position variable range is one of a plurality of second position variable ranges and/or the third position variable range is one of a plurality of third position variable ranges. In particular, the first position ranges/position variable ranges, the second position ranges/position variable ranges and/or the third position ranges/position variable ranges can alternate.

In one development, in particular one embodiment, of the invention, step b) involves: determining the direction variable for the rotation in the first direction or in the second direction, wherein the second direction is opposite the first direction, such that, when the method is carried out multiple times or repeatedly, the rotation is equally distributed in the first direction and in the second direction, in particular if the determined position variable is in the third position variable range. This allows uniform wear of the working device, especially of the synchronous motor. In particular, a distribution of the rotation in the first direction and in the second direction can be stored in such a way that the next determination can be carried out on the basis of the stored distribution.

In one development of the invention, the working device is, in particular operable, without a preferred direction of the rotor or free of a preferred direction. In particular, the term "preference" can be used synonymously for the term "priority".

In one development of the invention, the working device is a special harvester, in particular an olive shaker, or a hedge trimmer. Additionally or alternatively, the working device has a non-rotating, in particular oscillating translational, tool, in particular at least one rake. This allows the working device to be without a preferred direction of the rotor. In particular, the tool may be designed to move in two, in particular opposite, directions of movement. In other words, the tool may be designed to reverse the direction of movement or to move back and forth. Additionally or alternatively, the movement can describe the shape of an open or non-closed curve. Further additionally or alternatively, the term "reciprocal" or "linear" or "oscillating" can be used synonymously for the term "translational".

In one development of the invention, the working device has a conversion device, in particular a gearbox. The conversion device is designed to convert the rotation of the rotor into a non-rotating movement, in particular an oscillating translational movement. This allows the working device to be without a preferred direction of the rotor and/or to be the special harvester or the hedge trimmer and/or to have the non-rotating tool. Additionally or alternatively, uniformly distributed rotation allows uniform wear of the conversion device. In particular, the gearbox may be mechanical and/or a coupling gearbox, in particular a crank gear. Additionally or alternatively, the conversion can be automatic.

In one development of the invention, step a), in particular the method up to step c), is without a rotation of the rotor. Additionally or alternatively, step b) is after step a) without an intermediate step and/or immediately. Further additionally or alternatively, step c) is after step b) without an intermediate step and/or immediately and/or without a standstill of the rotor. This enables a good and/or, in particular thus, user-friendly behaviour of the working device when starting and/or turning or turning on the synchronous motor. In particular, the term "direct" can be used synonymously for the term "immediate".

In one development of the invention, the determination involves measuring at least one inductance, in particular inductances, of the synchronous motor, in particular of the stator, by means of test signals, in particular an indirect flux determination by online reactance measurement (INFORM), a high-frequency square-wave injection, or an injection of a rotating or alternating test signal in a rotor-oriented or stator-oriented coordinate system. This allows the determination to be reliable and/or fast. In particular, the inductance may be present and/or have a value. Additionally or alternatively, the test signals may be high-frequency and/or voltage test signals. In other words, the strength and duration of the test signals can be selected to be so short that there can be no rotation of the rotor as a result. For example, the test signals may be, in particular three, square-wave or sinusoidal test voltages, in particular which can be applied to associated phases of the three-phase synchronous motor. Further additionally or alternatively, the synchronous motor may have at least one voltage and/or current sensor for measuring, in particular voltages and/or currents in the phases. Reference is also made to the specialist literature.

In one development of the invention, the position variable is the position, in particular determined by means of calculation. Additionally or alternatively, the direction variable is the direction, in particular determined. In particular, the position variable range can be the position range.

In one development of the invention, the absolute value of the torque that can be generated by the synchronous motor can be achieved when the latter is sensorlessly actuated with at most a maximum permissible current amplitude of the synchronous motor. This makes it possible to avoid damage to the synchronous motor. In particular, the current amplitude may have a value. Additionally or alternatively, the term "nominal current" can be used synonymously for the term "maximum permissible current amplitude".

The hand-held working device according to the invention comprises the permanently excited synchronous motor and a control device. The control device is designed to carry out a method, in particular the method, as described above. The working device may enable the same advantage(s) as described above for the method. In particular, the working device may be designed as described above for the method. Additionally or alternatively, the control device may be electrical and/or in the form of a microprocessor controller. Further additionally or alternatively, the execution can be automatic.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 to 4 show a method according to the invention for operating a permanently excited synchronous motor 2 of a hand-held working device 1 and the hand-held working device 1 comprising the permanently excited synchronous motor 2 and a control device 3. The control device 3 is designed to carry out the method, in particular carries out said method.

Figure 1:
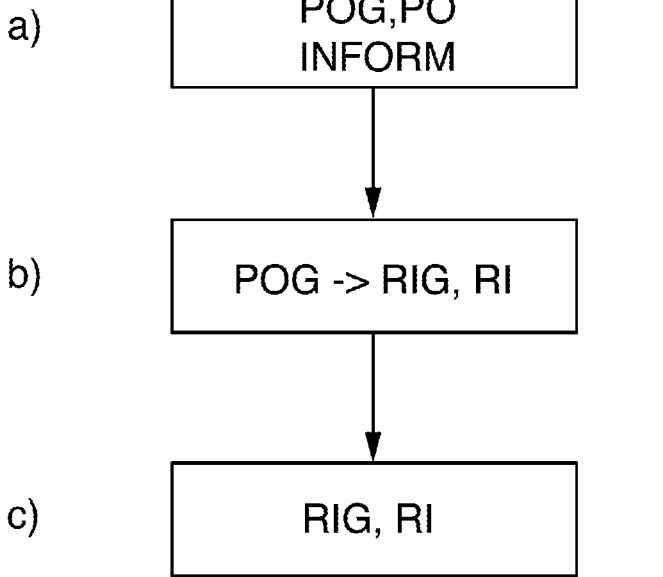
FIG. 1 is a flowchart of a method according to an embodiment of the invention for operating a permanently excited synchronous motor of a hand-held working device.
Figure 2:
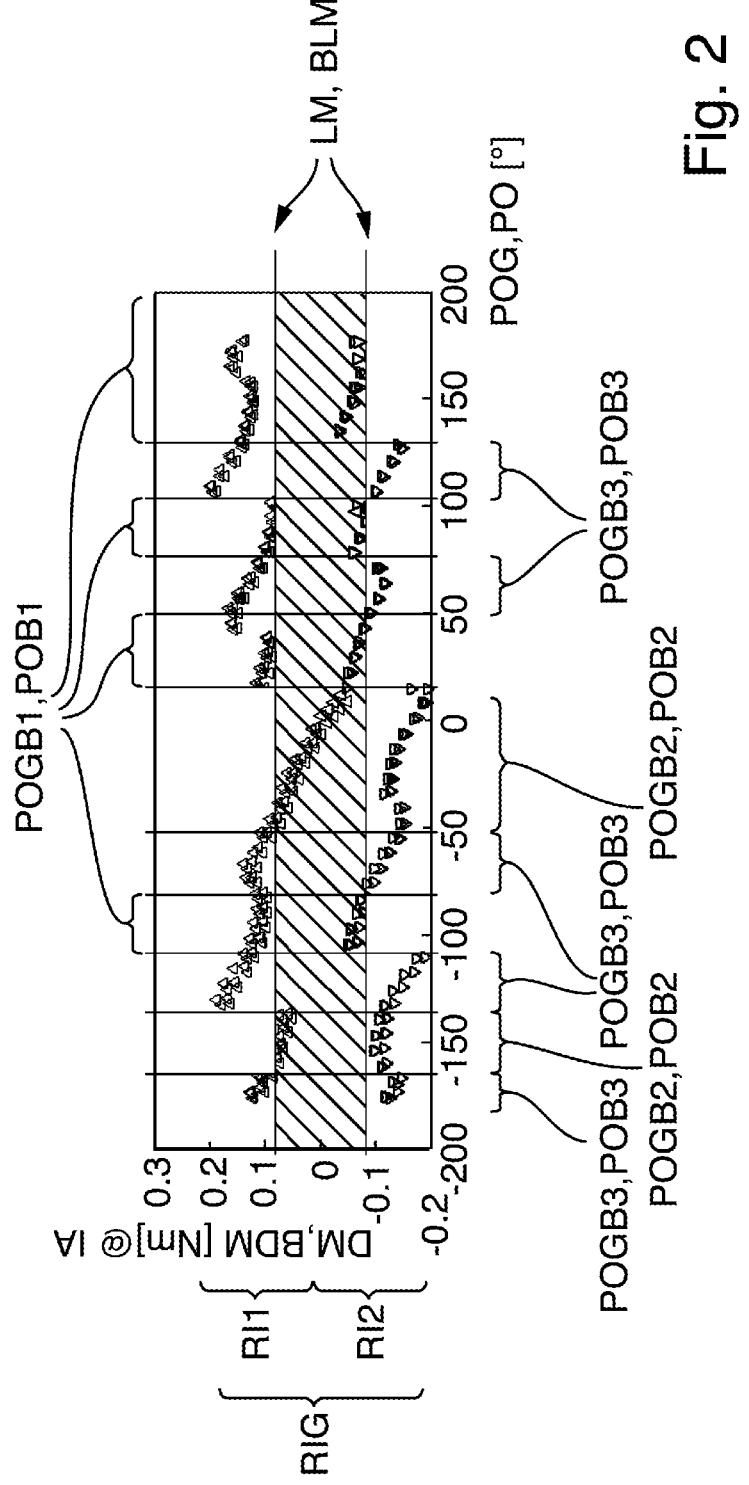
FIG. 2 schematically shows a graph of an attainable torque that can be generated by the synchronous motor when the latter is sensorlessly actuated to rotate a rotor of the synchronous motor from a standstill in a direction against possible positions of the rotor.

The method comprises the steps of: a) sensorlessly determining a position variable POG representative of a position PO of a rotor 4 of the synchronous motor 2 at a standstill by means of the control device 3; b) determining a direction variable RIG for a continuous rotation of the rotor 4 from standstill in a direction RI on the basis of the determined position variable POG such that an absolute value BDM of an attainable torque DM that can be generated by the synchronous motor 2 during its sensorless actuation for the rotation in the direction RI is greater than an absolute value BLM of a breakaway torque limit LM of the working device 1, as shown in FIG. 2, by means of the control device 3; c) sensorlessly actuating the synchronous motor 2 on the basis of the determined direction variable RIG for the rotation in the direction RI by means of the control device 3.

In detail, step b) involves: determining the direction variable RIG for the rotation in a first direction RI1 if the determined position variable POG is in a first position variable range POGB1 representative of a first position range POB1 of possible positions of the rotor 4. In the first position range POB1, the absolute value BDM of the torque DM for the rotation in the first direction RI1 is greater than, and in a second direction RI2 is equal to or less than, the absolute value BLM of the breakaway torque limit LM. The second direction RI2 is opposite the first direction RH.

Step b) furthermore involves: determining the direction variable RIG for the rotation in the second direction RI2 if the determined position variable POG is in a second position variable range POGB2 representative of a second position range POB2 of possible positions of the rotor 4. The second position variable range POGB2 differs from the first position variable range POGB1. In the second position range POB2, the absolute value BDM of the torque DM for the rotation in the second direction RI2 is greater than, and in the first direction RI1 is equal to or less than, the absolute value BLM of the breakaway torque limit LM.

Additionally or alternatively, step b) involves: determining the direction variable RIG for the rotation in the first direction RI1 or in the second direction RI2 if the determined position variable POG is in a third position variable range POGB3 representative of a third position range POB3 of possible positions of the rotor 4. The third position variable range POGB3 differs from the first position variable range POGB1 and in particular the second position variable range POGB2. In the third position range POB3, the absolute value BDM of the torque DM for the rotation in the first direction RI1 and in the second direction RI2 is greater than the absolute value BLM of the breakaway torque limit LM.

In detail, the first position range POB1 and/or the second position range POB2 and/or the third position range POB3 extend(s) over a minimum of 1°, in particular a minimum of 2°, in particular a minimum of 5°, and/or a maximum of 180°, in particular a maximum of 120°, in particular a maximum of 60°.

Additionally or alternatively, the first position range POB1 is one of a plurality of first position ranges POB1, four in the exemplary embodiment shown, and/or the second position range POB2 is one of a plurality of second position ranges POB2, two in the exemplary embodiment shown, and/or the third position range POB3 is one of a plurality of third position ranges POB3, five in the exemplary embodiment shown.

Further additionally or alternatively, the first position variable range POGB1 is one of a plurality of first position variable ranges POGB1, four in the exemplary embodiment shown, and/or the second position variable range POGB2 is one of a plurality of second position variable ranges POGB2, two in the exemplary embodiment shown, and/or the third position variable range POGB3 is one of a plurality of third position variable ranges POGB3, five in the exemplary embodiment shown.

In the exemplary embodiment shown, the third position range POB3/position variable range POGB3, the second position range POB2/position variable range POGB2, the third position range POB3/position variable range POGB3, the first position range POB1/position variable range POGB1, the third position range POB3/position variable range POGB3, the second position range POB2/position variable range POGB2, the first position range POB1/position variable range POGB1, the third position range POB3/position variable range POGB3, the first position range POB1/position variable range POGB1, the third position range POB3/position variable range POGB3 and the first position range POB1/position variable range POGB1 alternate.

Step b) furthermore involves: determining the direction variable RIG for the rotation in the first direction RI1 or in the second direction RI2, wherein the second direction RI2 is opposite the first direction RI1, such that, when the method is carried out multiple times, the rotation is equally distributed in the first direction RI1 and in the second direction RI2, in particular if the determined position variable POG is in the third position variable range POGB3.

Furthermore, the working device 1 can be operated without a preferred direction of the rotor 4.

Figure 3:
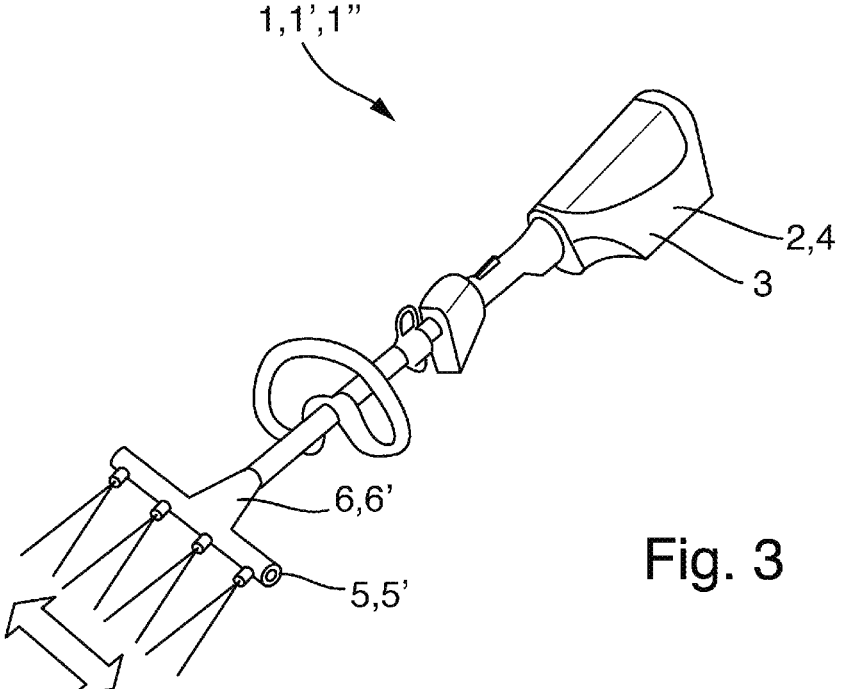
FIG. 3 shows the hand-held working device according to an embodiment of the invention in the form of a special harvester during operation of the synchronous motor.
Figure 4:
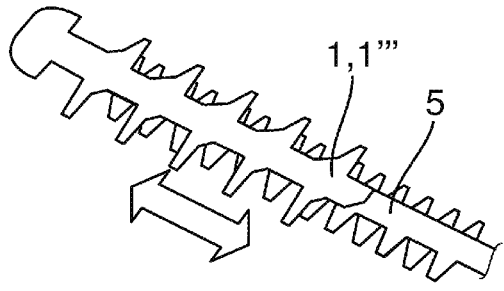
FIG. 4 shows the hand-held working device according to an embodiment of the invention in the form of a hedge trimmer during operation of the synchronous motor.

In addition, the working device 1 is a special harvester 1', in particular an olive shaker 1", as shown in FIG. 3, or a hedge trimmer 1‴, as shown in FIG. 4.

Additionally or alternatively, the working device 1 has a non-rotating, in particular oscillating translational, tool 5, in particular at least one rake 5', as shown in FIG. 3.

Furthermore, the working device 1 has a conversion device 6, in particular a gearbox 6'. The conversion device 6 is designed to convert, in particular converts, the rotation of the rotor 4 into a non-rotating movement, in particular an oscillating translational movement, in particular of the tool 5.

In addition, step a), in particular the method up to step c), is without a rotation of the rotor 4. Additionally or alternatively, step b) is after step a) without an intermediate step and/or immediately. Further additionally or alternatively, step c) is after step b) without an intermediate step and/or immediately and/or without a standstill of the rotor 4.

Further, the determination involves measuring at least one inductance of the synchronous motor 2 by means of test signals, in particular an indirect flux determination by online reactance measurement (INFORM), a high-frequency square-wave injection, or an injection of a rotating or alternating test signal in a rotor-oriented or stator-oriented coordinate system.

In addition, the position variable POG is the position PO, in particular determined by means of calculation. Additionally or alternatively, the direction variable RIG is the direction RI, in particular determined.

Furthermore, the absolute value BDM of the torque DM that can be generated by the synchronous motor 2 can be achieved when the latter is sensorlessly actuated with at most a maximum permissible current amplitude IA of the synchronous motor 2.

As the exemplary embodiments shown and explained above make clear, the invention provides an advantageous method for operating a permanently excited synchronous motor of a hand-held working device and an advantageous hand-held working device, each having improved properties.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a permanently excited synchronous motor of a hand-held working device, the method comprising the steps of:

a) sensorlessly determining a position variable (POG) representative of a position (PO) of a rotor of the synchronous motor at a standstill;

b) determining a direction variable (RIG) for a continuous rotation of the rotor from standstill in a direction (RI) on the basis of the determined position variable (POG) such that an absolute value (BDM) of an attainable torque (DM) that can be generated by the synchronous motor during sensorless actuation for the rotation in the direction (RI) is greater than an absolute value (BLM) of a breakaway torque limit (LM) of the working device; and c) sensorlessly actuating the synchronous motor on the basis of the determined direction variable (RIG) for the rotation in the direction (RI), wherein step b) comprises:

determining the direction variable (RIG) for the rotation in a first direction (RI1) if the determined position variable (POG) is in a first position variable range (POGB1) representative of a first position range (POB1) of possible positions of the rotor, wherein, in the first position range (POB1), the absolute value (BDM) of the torque (DM) for the rotation in the first direction (RI1) is greater than, and in a second direction (RI2) is equal to or less than, the absolute value (BLM) of the breakaway torque limit (LM), and the second direction (RI2) is opposite the first direction (RI1).

2. The method according to claim 1, wherein (i) step b) comprises:

determining the direction variable (RIG) for the rotation in the second direction (RI2) if the determined position variable (POG) is in a second position variable range (POGB2) representative of a second position range (POB2) of possible positions of the rotor, wherein the second position variable range (POGB2) differs from the first position variable range (POGB1), wherein, in the second position range (POB2), the absolute value (BDM) of the torque (DM) for the rotation in the second direction (RI2) is greater than, and in the first direction (RI1) is equal to or less than, the absolute value (BLM) of the breakaway torque limit (LM), and/or (ii) step b) comprises:
determining the direction variable (RIG) for the rotation in the first direction (RI1) or in the second direction (RI2) if the determined position variable (POG) is in a third position variable range (POGB3) representative of a third position range (POB3) of possible positions of the rotor, wherein the third position variable range (POGB3) differs from the first position variable range (POGB1) and the second position variable range (POGB2), wherein, in the third position range (POB3), the absolute value (BDM) of the torque (DM) for the rotation in the first direction (RI1) and in the second direction (RI2) is greater than the absolute value (BLM) of the breakaway torque limit (LM).

3. The method according to claim 2, wherein
(i) the first position range (POB1) and/or the second position range (POB2) and/or the third position range (POB3) extend(s) over a minimum of 1° and/or a maximum of 180°, and/or
(ii) the first position range (POB1) is one of a plurality of first position ranges (POB1) and/or the second position range (POB2) is one of a plurality of second position ranges (POB2) and/or the third position range (POB3) is one of a plurality of third position ranges (POB3); and/or
(iii) the first position variable range (POGB1) is one of a plurality of first position variable ranges (POGB1) and/or the second position variable range (POGB2) is one of a plurality of second position variable ranges (POGB2) and/or the third position variable range (POGB3) is one of a plurality of third position variable ranges (POGB3).

4. The method according to claim 2, wherein
the first position range (POB1) and/or the second position range (POB2) and/or the third position range (POB3) extend(s) over a minimum of 5° and/or a maximum of 60°.

5. The method according to claim 3, wherein step b) comprises:
determining the direction variable (RIG) for the rotation in a first direction (RI1) or in a second direction (RI2), wherein
the second direction (RI2) is opposite the first direction (RI1), such that, when the method is carried out multiple times, the rotation is equally distributed in the first direction (RI1) and in the second direction (RI2), in particular if the determined position variable (POG) is in the third position variable range (POGB3).

6. The method according to claim 1, wherein
the working device is operatable without a preferred direction of the rotor.

7. The method according to claim 1, wherein
the working device is a special harvester, and/or
the working device has a non-rotating tool.

8. The method according to claim 1, wherein
the working device is an olive shaker or a hedge trimmer, and/or
the working device has an oscillating translational tool.

9. The method according to claim 1, wherein
the working device has a gearbox that converts the rotation of the rotor into a non-rotating movement.

10. The method according to claim 1,
wherein step a) is performed without a rotation of the rotor, and/or
wherein step b) is performed after step a) without an intermediate step and/or immediately, and/or
wherein step c) is performed after step b) without an intermediate step and/or immediately and/or without a standstill of the rotor.

11. The method according to claim 1, wherein
the determining involves measuring at least one inductance of the synchronous motor by use of test signals.

12. The method according to claim 1, wherein the determining involves an indirect flux determination by online reactance measurement, a high-frequency square-wave injection, or an injection of a rotating or alternating test signal in a rotor-oriented or stator-oriented coordinate system.

13. The method according to claim 1, wherein
the position variable (POG) is the position (PO), determined by calculation, and/or
the direction variable (RIG) is the direction.

14. The method according to claim 1, wherein
the absolute value (BDM) of the torque (DM) that can be generated by the synchronous motor is achieved when the latter is sensorlessly actuated with at most a maximum permissible current amplitude (IA) of the synchronous motor.

15. A hand-held working device, comprising:
a user-operable operating element;
a permanently excited synchronous motor without a magnetic sensor; and
a processor implemented control device configured to carry out the acts of:
a) sensorlessly determining a position variable (POG) representative of a position (PO) of a rotor of the synchronous motor at a standstill;
b) determining a direction variable (RIG) for a continuous rotation of the rotor from standstill in a direction (RI) on the basis of the determined position variable (POG) such that an absolute value (BDM) of an attainable torque (DM) that can be generated by the synchronous motor during sensorless actuation for the rotation in the direction (RI) is greater than an absolute value (BLM) of a breakaway torque limit (LM) of the working device; and
c) sensorlessly actuating the synchronous motor on the basis of the determined direction variable (RIG) for the rotation in the direction (RI),
wherein the sensorless actuating is initiated via operation of the user-operable operating element.

16. A method for operating a permanently excited synchronous motor of a hand-held working device, the method comprising the steps of:
a) sensorlessly determining a position variable (POG) representative of a position (PO) of a rotor of the synchronous motor at a standstill, wherein the synchronous motor does not have a magnetic sensor;
b) determining a direction variable (RIG) for a continuous rotation of the rotor from standstill in a direction (RI) on the basis of the determined position variable (POG) such that an absolute value (BDM) of an attainable torque (DM) that can be generated by the synchronous motor during sensorless actuation for the rotation in the direction (RI) is greater than an absolute value (BLM) of a breakaway torque limit (LM) of the working device; and c) operating a user-operable operating element to sensor-lessly actuate the synchronous motor on the basis of the determined direction variable (RIG) for the rotation in the direction (RI), wherein steps (a) and (b) are carried out without a rotation of the rotor.

\* \* \* \* \*